United States Patent
Blanchard

(12) 
(10) Patent No.: US 6,742,409 B2
(45) Date of Patent: Jun. 1, 2004

(54) DEVICE FOR TRANSMISSION BETWEEN A PRIMARY MOTOR SHAFT AND AN OUTPUT SHAFT AND LAWN MOWER PROVIDED WITH SUCH A DEVICE

(75) Inventor: Robert Blanchard, Le Boupere (FR)

(73) Assignee: France Reducteurs, Les Herbiers (FR)

(*) Notice: Subject to any disclaimer, the term of this patent is extended or adjusted under 35 U.S.C. 154(b) by 0 days.

(21) Appl. No.: 10/114,026

(22) Filed: Apr. 3, 2002

(65) Prior Publication Data
US 2002/0139210 A1 Oct. 3, 2002

(30) Foreign Application Priority Data
Apr. 3, 2001 (FR) .............................. 01 04520

(51) Int. Cl.[7] .............................. F16H 1/16
(52) U.S. Cl. .......................... 74/425; 74/416
(58) Field of Search .................. 74/425, 409, 440, 74/416

(56) References Cited

U.S. PATENT DOCUMENTS

| 6,032,550 A | * | 3/2000 | Rugh | 74/425 |
| 6,352,006 B1 | * | 3/2002 | Kurashita | 74/409 |
| 6,470,766 B2 | * | 10/2002 | Ohta et al. | 74/425 |

* cited by examiner

Primary Examiner—David Fenstermacher
(74) Attorney, Agent, or Firm—Young & Thompson

(57) ABSTRACT

A transmission device between a primary motor shaft (1) and an output shaft, includes a casing (3) constituted by two half shells, a driving member (4), and a driven member (5) mounted on the output shaft (2). The driving member (4) is held in position by bearings (6A, 6B) provided in each half shell (3A, 3B), these bearings (6A, 6B) being disposed facing each other in the assembled condition of the half shells (3A, 3B).

14 Claims, 6 Drawing Sheets

DEVICE FOR TRANSMISSION BETWEEN A PRIMARY MOTOR SHAFT AND AN OUTPUT SHAFT AND LAWN MOWER PROVIDED WITH SUCH A DEVICE

FIELD OF THE INVENTION

The present invention relates to a device for transmission between a primary motor shaft and an output shaft, such as a drive shaft for the wheels of a self-propelled machine, such as lawn mowers.

It relates more particularly to a transmission device comprising at least, disposed at least partially within a casing constituted by two half shells assembleable on a joint plane, a reducing mechanism constituted by a driving member, such as an endless screw, and a driven member, such as a tangent toothed wheel, mounted on the output shaft, the driving member being held in position within the casing by means of bearings provided in each half shell, these bearings being disposed facing each other in the assembled condition of the two half shells.

BACKGROUND OF THE INVENTION

Such devices are at present well known to those skilled in this art and are widely used particularly for the transmission of movement between the primary motor shaft that carries the lawn mower blade, and the output shaft of the wheels of said mower. In devices known at present, each bearing adapted to receive one end of the endless screw, is a ball bearing. The presence of ball roller ways permits receiving, independently of the direction of rotation of the toothed wheel, the axial forces to which the endless screw is subjected under the action of the toothed wheel. However, such pieces are cumbersome.

SUMMARY OF THE INVENTION

An object of the present invention is to provide a transmission device whose design permits replacing a roller bearing adapted to receive one end of the endless screw, by a smooth bearing so as to permit omitting ball roller ways so as to reduce the cost of such a device.

To this end, the invention has for its object a transmission device between a primary motor shaft and an output shaft, such as a drive shaft for the wheels of self-driven machines, such as lawn mowers, this device comprising at least, disposed at least partially within a casing constituted by two half shells assembleable along a joint plane, a reducing mechanism constituted by a driving member, such as an endless screw, and a driven member, such as a tangent toothed wheel, mounted on the output shaft, the driving member being held in position by means of bearings provided in each half shell, these bearings being disposed facing each other in the assembled condition of the half shells, characterized in that one end of the endless screw is disposed in a smooth bearing of a half shell of the casing, and in that it is provided adjacent this bearing, generally on opposite sides of this bearing, with at least one, preferably two, cross members that bear on a wall, preferably the bottom wall, of the half shell and extending in the direction of the bearing of the opposite half shell to bear, in the assembled condition of the half shells, against the radial surface of a roller way, preferably a ball bearing, which is part of said bearing, the end of the endless screw, supported by the roller bearing, being immobilized axially by at least one stop means, the axial forces, borne by the endless screw under the action of the tangent toothed wheel, being neutralized by the presence of these cross pieces.

The invention also has for its object a self-propelled lawn mower of the type comprising, between its primary motor shaft and the output shaft for driving the wheels of the mower, a transmission device, characterized in that the transmission device is according to the above described device.

BRIEF DESCRIPTION OF THE DRAWINGS

The invention will be better understood from a reading of the following description of embodiments, with reference to the accompanying drawings, in which.

DETAILED DESCRIPTION OF THE INVENTION

Figure 1:
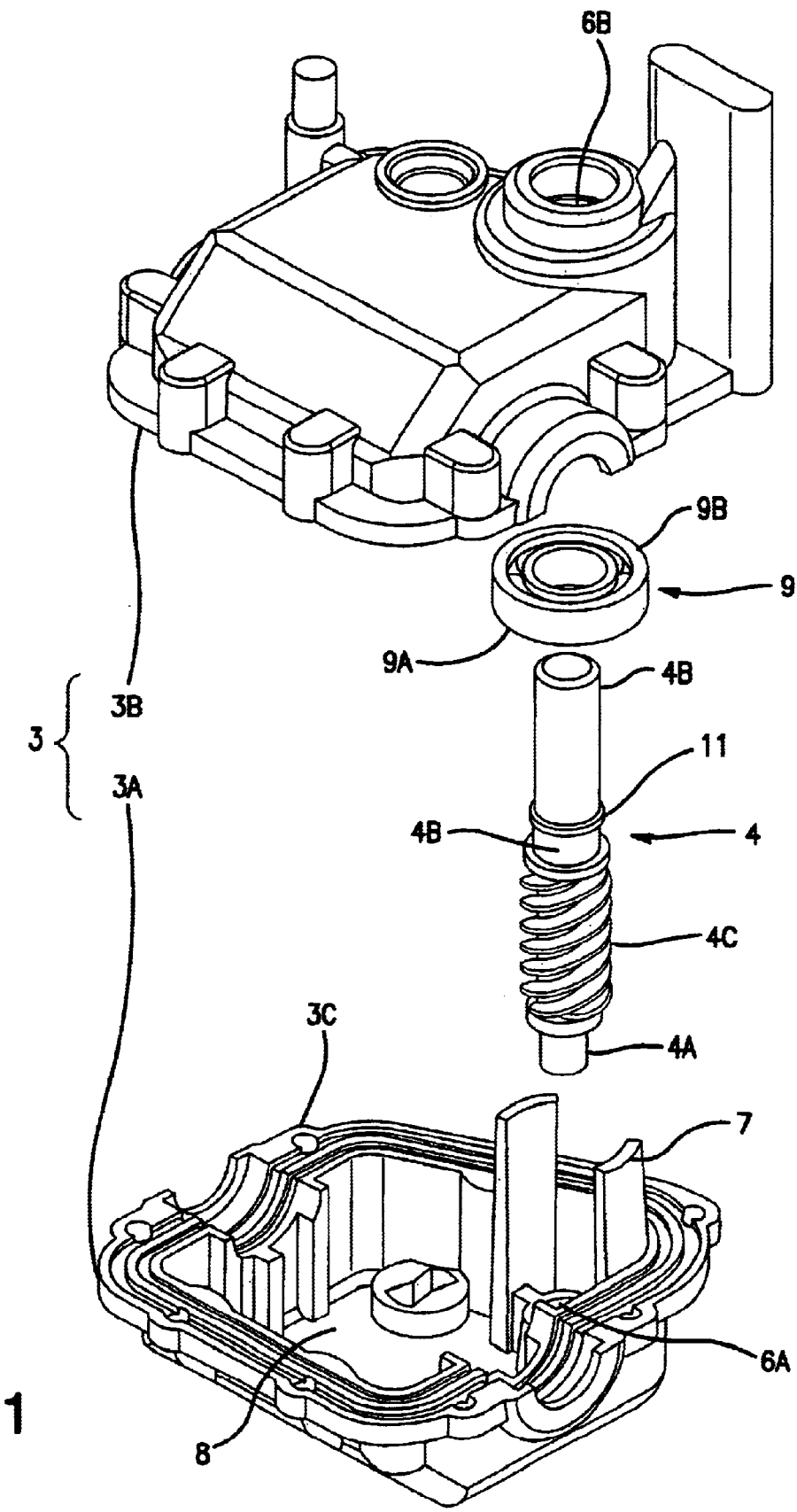
FIG. 1 is a fragmentary perspective schematic view of a transmission device according to the invention in the exploded element of its constituent elements.

As mentioned above, the transmission device according to the invention, is more particularly adapted to be applied to self-propelled machines, such as lawn mowers. This device ensures the transmission of movement between a primary motor shaft 1, generally the blade carrier, and an output shaft 2, such as the drive shaft for the wheels of the lawn mower. This device comprises at least a casing 3 constituted of two half shells 3A, 3B assembled along a joint plane 3C. This casing 3 contains at least partially a reducing mechanism constituted by an endless screw or worm 4 in engagement with a tangent toothed wheel or worm wheel 5 mounted freely in rotation on the output shaft 2.

The endless screw 4 is held in position within the casing 3 by means of bearings 6A, 6B provided in each half shell 3A, 3B. Bearings 6A, 6B are disposed facing each other in the assembled condition of the half shells 3A, 3B. The end 4A of the endless screw 4 is disposed, in a manner characteristic of the invention, in a smooth bearing 6A of a half shell 3A of the casing 3, whilst the end 4B of the endless screw 4 is disposed in a bearing 6B with rollers 9 preferably balls provided in the half shell 3B.

Figure 4:
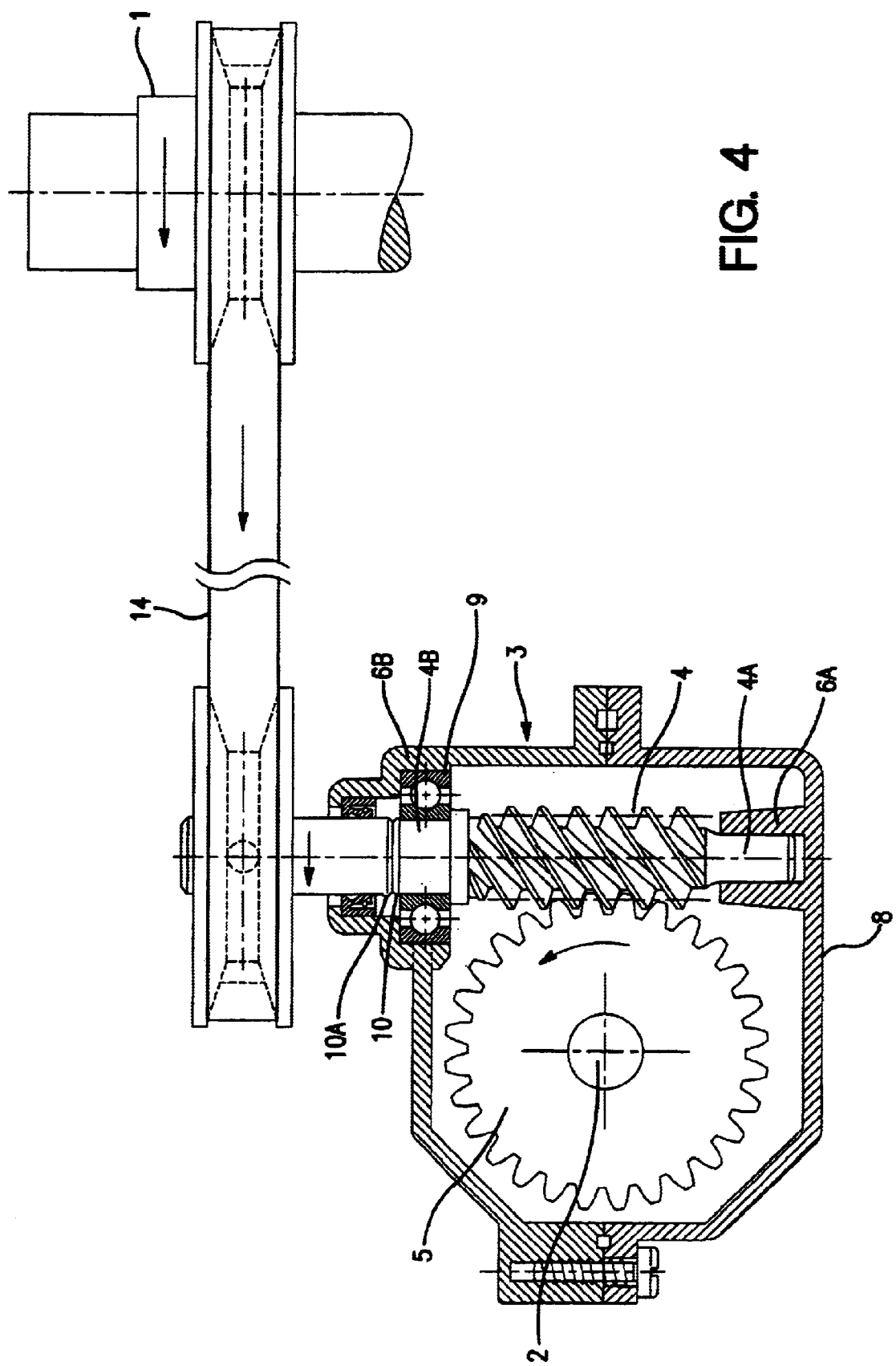
FIG. 4 is a fragmentary cross-sectional schematic view of a transmission device according to the invention in the closed condition of the casing.

To permit the smooth bearing 6A to resist in the presence of axial forces undergone by the endless screw 4 under the action of the tangent toothed wheel 5, as shown in FIG. 4, there is provided, adjacent this bearing 6A, generally on opposite sides of this bearing 6A, at least one and preferably two cross pieces 7. These cross pieces bear on a wall, preferably the rear wall 8, of the half shell 3A and extend in the direction of the bearing 6B of the opposite half shell 3B to bear, in the assembled condition of the two half shells 3A, 3B, against the radial surface of the roller way 9 provided in the bearing 6B. The end 4B of the endless screw 4, supported by the bearing 6B with roller way 9, is moreover immobilized axially by at least one stop means 10, 11, 12. This stop means, shown at 10, 11, 12 in the figures of drawings, transmits to the cross pieces 7 the axial forces received by the endless screw 4 under the action of the toothed tangent wheel 5, and the cross pieces 7 neutralize these axial forces such that the bearing 6A does not need to be provided with a roller way.

In the illustrated examples, the cross pieces 7 are made of one piece with a wall, preferably the bottom wall 8, of the half shell 3A. This bottom wall 8 is moreover provided with the smooth bearing 6A. This smooth bearing 6A can be constituted of a piece shaped analogous to bearing 6B with the roller way 9. However, in a preferred embodiment of the invention according to that shown in the figures, the smooth bearing 6A and/or the bearing 6B with the roller way 9 are respectively made of the same piece with a half shell 3A, 3B of the casing 3.

The cross pieces 7 can themselves have a larger number of shapes. In the illustrated examples, the cross pieces 7 have the form of bars spaced apart by a space sufficient to permit at least the passage of the section of the tangent toothed wheel 5 in engagement with the endless screw 4. These bars thus extend coaxially to the axis of the endless screw 4. These cross pieces 7 bear, in the assembled condition of the half shells 3A, 3B, against the radial surface 9A of the roller way 9. This radial surface is constituted by the external fixed crown of the ball roller way 9.

Similarly, and so as to obtain neutralization of the axial forces borne by the endless screw 4 under the action of the toothed wheel 5, the end of the endless screw 4 supported by the bearing 6B of the roller way 9 is axially immobilized by means of a stop means. This stop means axially immobilizes the endless screw in at least one direction by preventing this latter to move in the direction of the smooth bearing 6A under the influence of the axial forces borne by the endless screw 4. This stop means is hence arranged to bear on a radial surface 9B of the roller way 9 opposite the surface 9A that bears against the cross pieces 7. In all the illustrated examples, the stop means thus bears on the radial surface 9B of the movable crown of the roller way 9 whilst the cross pieces 7 come into bearing against the oppositely disposed radial surface constituted by the radial surface of the fixed crown of the ball roller way 9.

Figure 2:
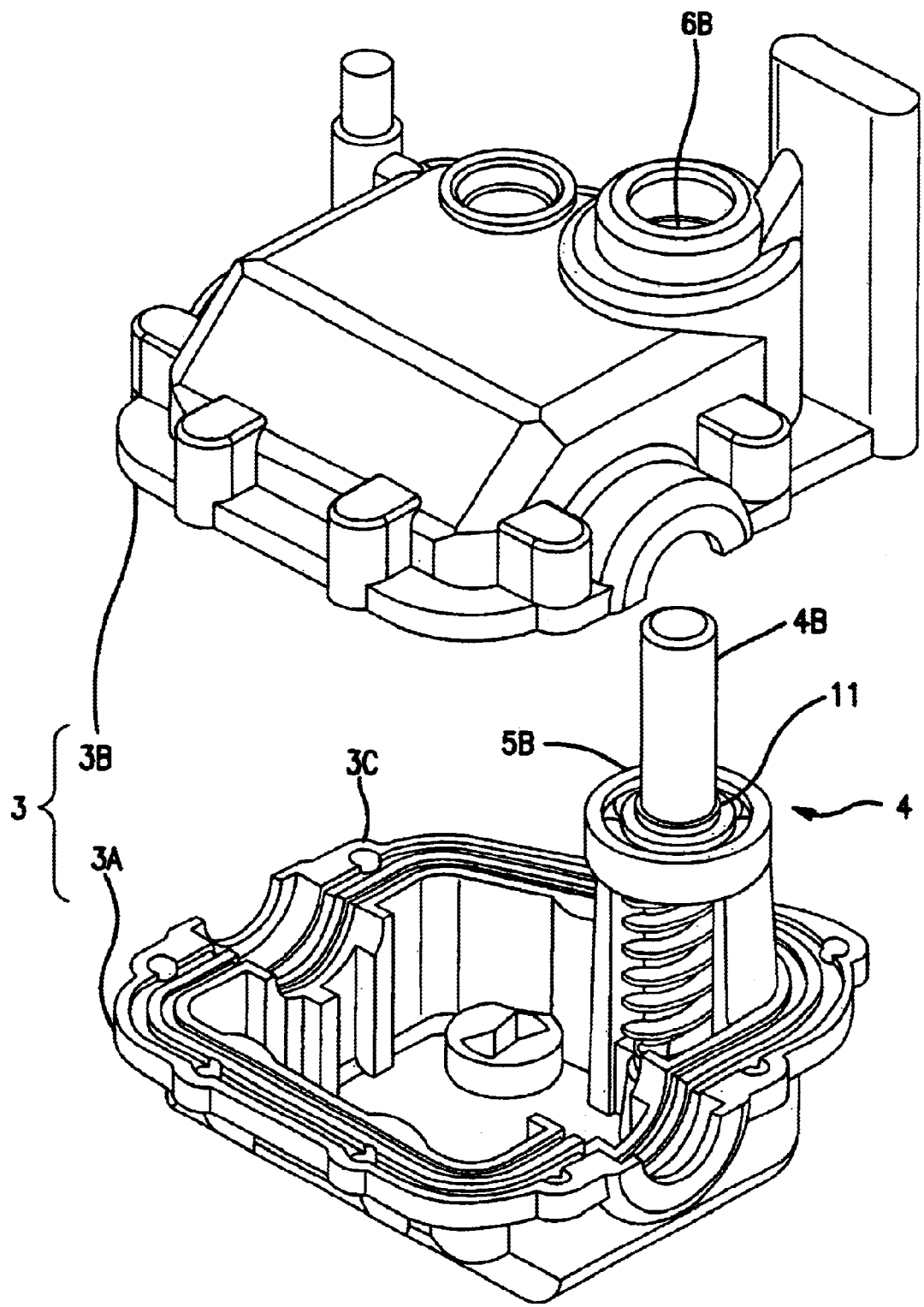
FIG. 2 is a fragmentary schematic perspective view of the transmission device of FIG. 1 in the partially assembled condition of its constituents.

As shown in the drawings, the stop means can have a larger number of shapes. Thus, in the example shown in FIG. 1, the end 4B of the endless screw 4 supported by the bearing 6B with the roller way 9 is constituted by an axle portion disposed in the bearing 6B with the roller way 9 and extends in the direction of the free end of said axle by an axle portion of smaller diameter so as to provide between said sections a shoulder 11, this shoulder 11 being deformed after insertion of the roller way 9 onto said axle of the endless screw to form the stop means axially immobilizing the end 4B of the endless screw 4. This immobilization is shown in FIG. 2.

In another embodiment of the invention, the stop means can be constituted by at least one enlargement provided on the axle of the endless screw 4, this enlargement bearing on the radial surface 9B of the internal movable crown of the roller way 9 opposite the radial surface 9A of the external fixed crown of the roller way 9 by bearing on the cross pieces 7. Thus, in the example shown in FIG. 3, the stop means is constituted by at least two successive enlargements 10, 10A obtained by hollowing out the constituent material of the axle of the endless screw 4 after mounting the roller way 9 on the axle of the endless screw 4.

Figure 6:
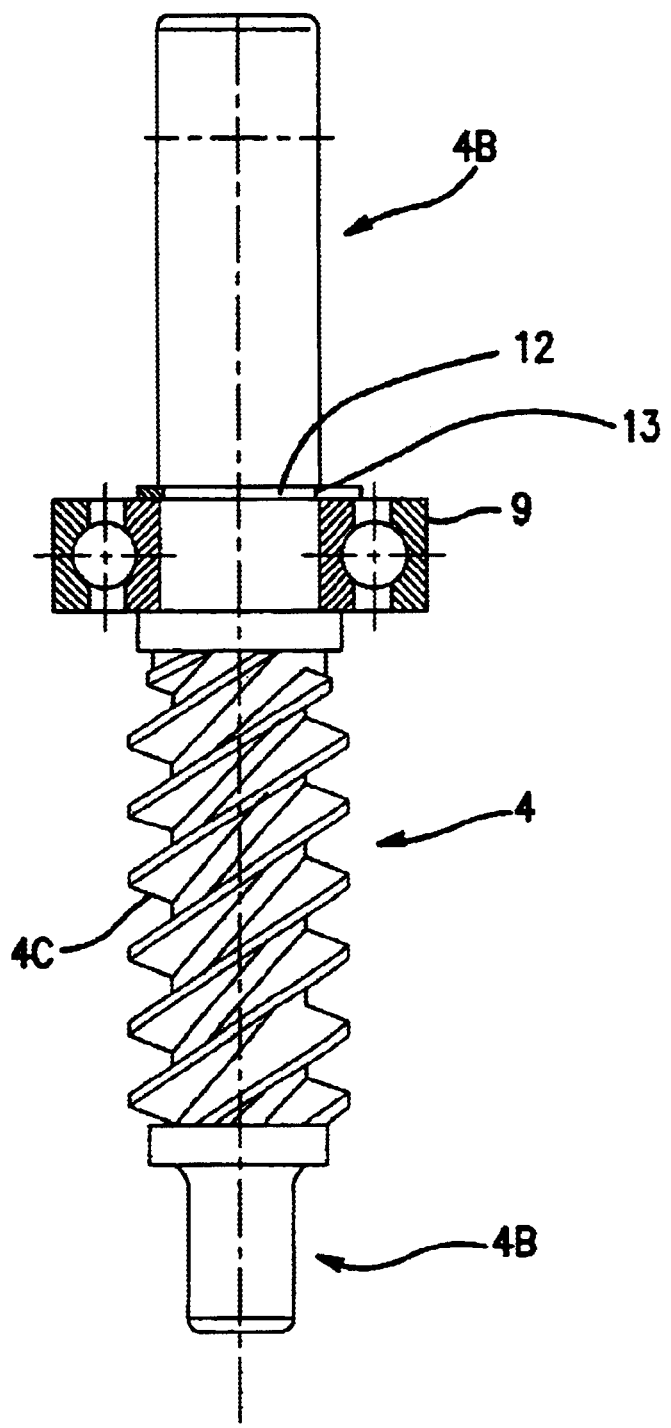
FIG. 6 is a schematic view of another embodiment of a stop means for the endless screw.

Finally, in the embodiment shown in FIG. 6, the stop means is constituted by an added member 12, such as a pin or a circlip disposed within a throat 13 provided on the axle of the endless screw 4 adjacent the region of the axle disposed within the bearing 6B with roller way 9, to permit the added piece 12 to bear against the radial surface 9B of the roller way 9 opposite to the surface 9A that bears against the cross pieces 7.

Of course, other embodiments of this stop means can be imagined. In the case in which the direction of rotation of the toothed wheel will be reversed relative to that shown in FIG. 4, there can be provided a supplemental stop means axially immobilizing the axle of the endless screw against a movement in the direction of the bearing 6B with the roller way 9. This means can be constituted by a small collar as shown in the figures.

Figure 3:
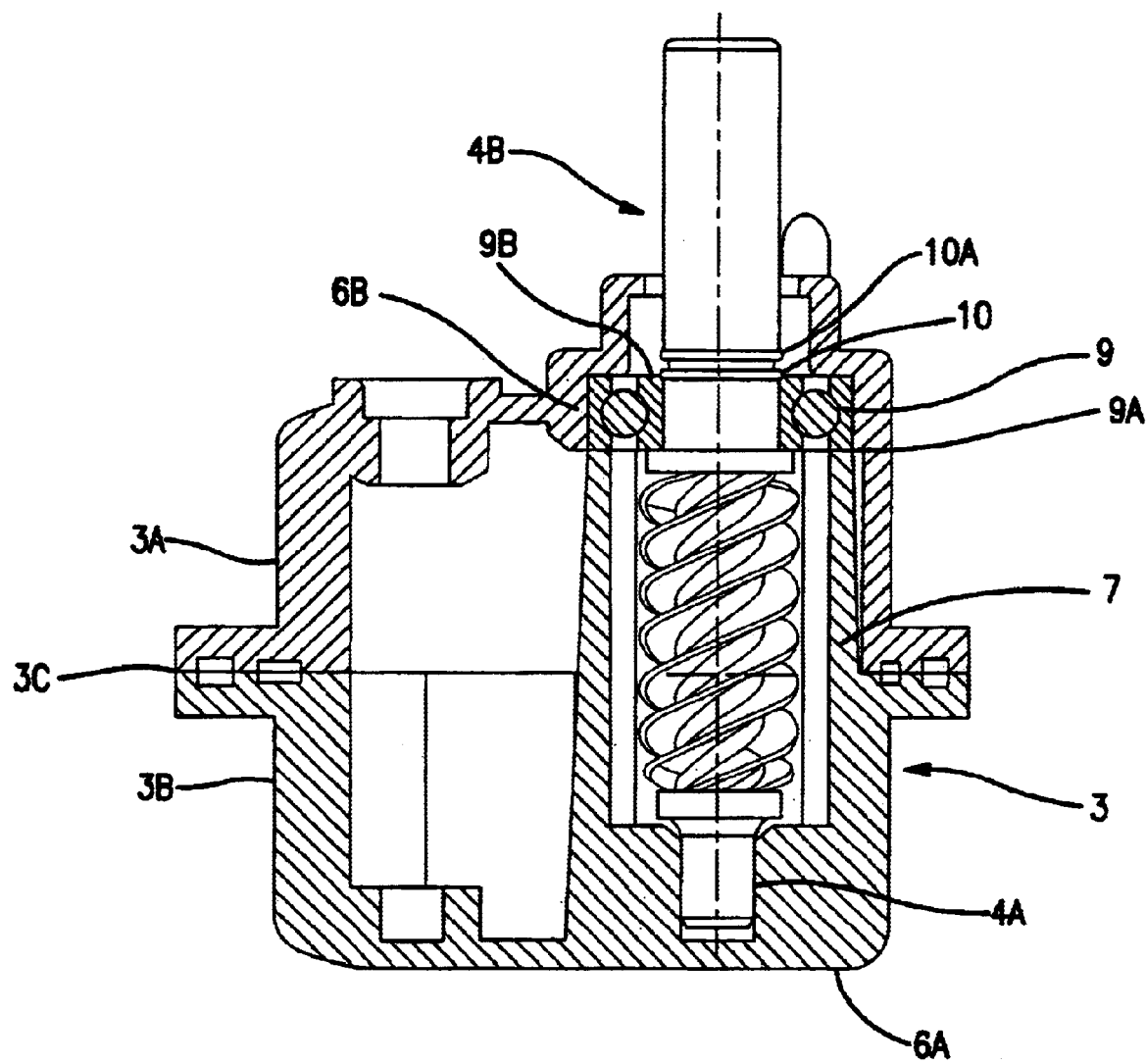
FIG. 3 is a schematic partial cross-sectional view of another embodiment of the device of the invention in the assembled condition of its constituent elements.

Generally speaking, this endless screw 4 comprises on opposite sides of a section 4C of a screw-threaded axle adapted to come into engagement with a tangent toothed wheel, a section 4A, 4B of smooth shaft adapted to be disposed in one of the bearings 6A, 6B. The section 4B of smooth shaft is prolonged beyond the bearing 6B with the roller way 9 to project from the casing 3 so as to be mechanically coupled by means of a transmission mechanism 14 to the primary motor shaft 1. The screw-threaded portion and the portions of smooth shaft are separated from each other by small collars disposed on the axle of the endless screw, as shown in FIGS. 3 and 4.

The transmission mechanism 14 between a primary shaft and an endless screw can itself be constituted, as shown in FIG. 4, by a transmission device with a belt, this belt extending into the interior of a throat between two pulleys carried respectively one by the endless screw portion projecting from the casing, the other by the primary motor shaft 1, this primary motor shaft being, in the case of a lawn mower, the blade carrying shaft of the lawn mower.

To complete such a transmission device, the casing 3 moreover encloses a clutch mechanism 15 carried by the output shaft 2. This mechanism 15 coacts with the toothed wheel 5 freely rotatably mounted on the output shaft 2, to secure together in rotation, as desired, at least one suitable control member 16, the output shaft 2 and the toothed wheel 5.

Figure 5:
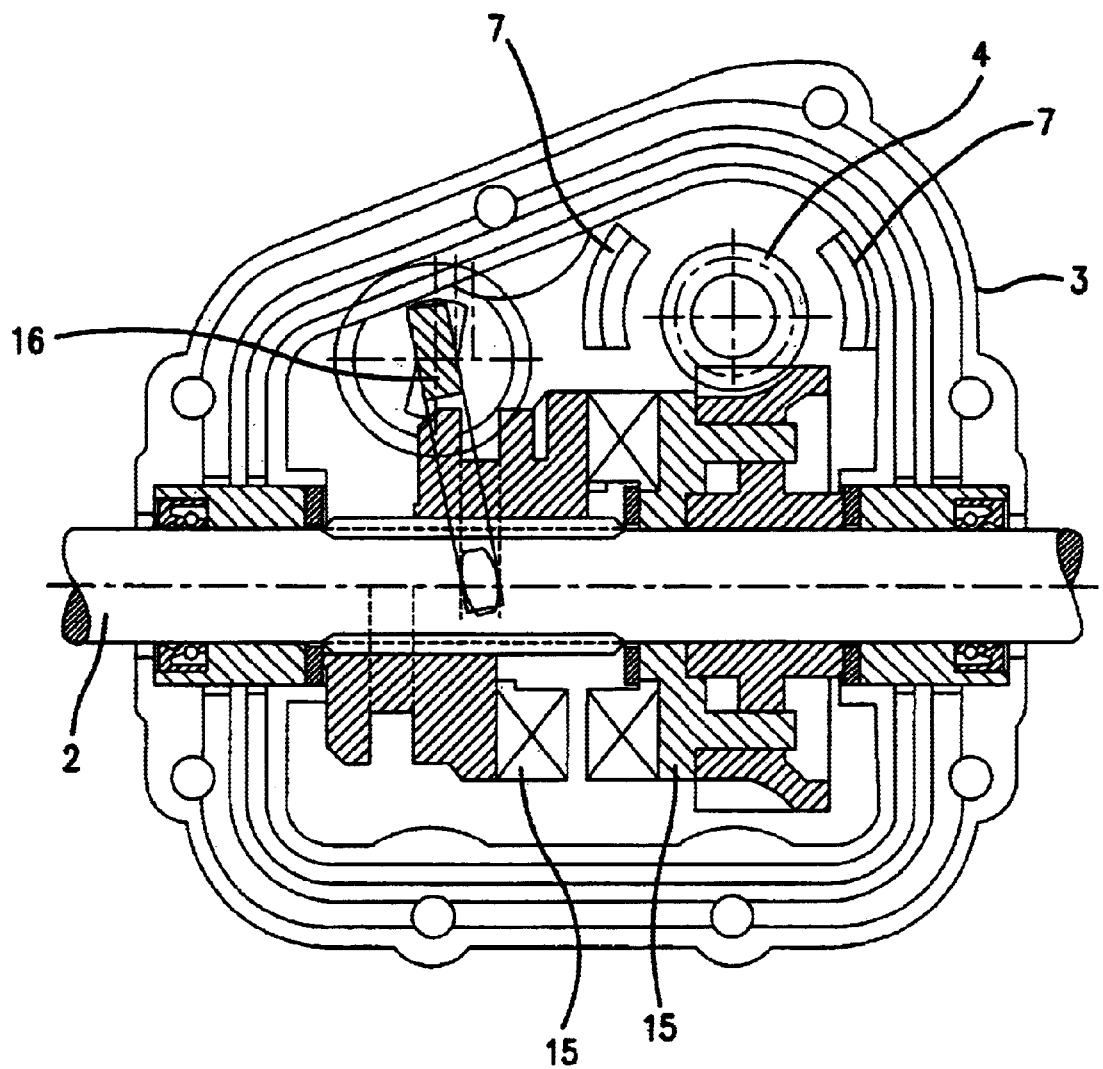
FIG. 5 is a fragmentary schematic cross-sectional view on the line A—A of FIG. 4.

In the example shown in FIG. 5, this clutch mechanism 15 is of the dog clutch type. However, other clutch mechanisms, such as a cone clutch mechanism, could be used in a similar manner.

What is claimed is:

1. Transmission device between a primary motor shaft and an output shaft, comprising:

disposed at least partially within a casing constituted by two half shells assembleable on a joint plane, a reducing mechanism including a driving member and a driven member mounted on the output shaft;

said driving member being held in position by bearings provided in each half shell;

said bearings being disposed facing each other in an assembled condition of the half shells, and comprising a first smooth bearing and a second bearing;

a first end of the driving member being disposed in the smooth bearing in one half shell of the casing;

at least two cross pieces bearing against a wall adjacent said smooth bearing and extending in the direction of the second bearing of the opposite half shell to bear, in the assembled condition of the two half shells, against the radial surface of a roller way, provided for said second bearing; and a second end of the driving member, supported by the second bearing being axially immobilized by at least one stop means, whereby axial forces borne by the driving member under the influence of the driven member are neutralized by the presence of the cross pieces.

2. The transmission device according to claim 1, wherein the driving member is a worm and the driven member is a tangent worm wheel.

3. The transmission device according to claim 2, wherein the stop means axially immobilizing the worm in at least one direction are arranged to bear on one radial surface of the roller way opposite to that bearing against the cross pieces.

4. The transmission device according to claim 3, wherein the stop means comprise at least one enlargement provided on the axle of the worm; said enlargement bearing on a radial surface of the roller way opposite to that bearing on the cross pieces.

5. The transmission device according to claim 3, wherein the stop means comprise at least two successive enlargements obtained by widening the constituent material of the axle of the worm after mounting the roller way on the axle of the worm.

6. The transmission device according to claim 3, wherein the second end of the worm supported by the second bearing comprise an axial portion disposed in the second bearing and is prolonged in the direction of the free end of said axle by a portion of the axle of smaller diameter so as to provide a shoulder between axle sections; said shoulder being deformed after insertion of the roller way onto said axle of the worm to form the stop means axially immobilizing the second end of the worm.

7. The transmission device according to claim 3, wherein the stop means comprise an added member, which is disposed within a throat provided on the axle of the worm adjacent the region of the axle disposed within the second bearing to permit the added member to bear against the radial surface of the roller way opposite that bearing against the cross members.

8. The transmission device according to claim 2, wherein the worm comprises on opposite sides of a section of screw-threaded axle adapted to come into engagement with the tangent worm wheel, a section of smooth shaft adapted to be disposed in one of the bearings; said section of smooth shaft being prolonged beyond the second bearing to project from the casing so as to be mechanically coupled by a transmission mechanism to a primary motor shaft.

9. The transmission device according to claim 2, wherein the casing further encloses a clutch mechanism carried by the output shaft; said clutch mechanism coacting with the worm wheel mounted freely rotatably on the output shaft to secure in rotation, by at least a suitable control member the output shaft and the worm wheel.

10. The transmission device according to claim 2, wherein the cross pieces have the shape of bars spaced apart from each other, and a thickness sufficient to permit the passage of a portion of tangent worm wheel in engagement with the worm.

11. The transmission device according to claim 10, wherein the bars extend coaxially to the axis of the worm.

12. The transmission device according to claim 1, wherein the cross pieces are made of one piece with a bottom wall of a half shell.

13. The transmission device according to claim 1, wherein at least one of the smooth bearing and the second bearing is respectfully made from and during the production of a half shell of the casing.

14. A self-propelled lawn mower comprising a primary motor shaft and an output shaft for driving the wheels of the mower, and a transmission device comprising:

disposed at least partially within a casing constituted by two half shells assembleable on a joint plane, a reducing mechanism including a driving member and a driven member mounted on the output shaft;

said driving member being held in position by bearings provided in each half shell;

said bearings being disposed facing each other in an assembled condition of the half shells, and comprising a first smooth bearing and a second bearing;

a first end of the driving member being disposed in the smooth bearing in one half shell of the casing;

at least two cross pieces bearing against a wall adjacent said smooth bearing and extending in the direction of the second bearing of the opposite half shell to bear, in the assembled condition of the two half shells, against the radial surface of a roller way, provided for said second bearing; and a second end of the driving member, supported by the second bearing being axially immobilized by at least one stop means, whereby axial forces borne by the driving member under the influence of the driven member are neutralized by the presence of the cross pieces.

* * * * *